United States Patent
Blem et al.

(10) Patent No.: US 11,093,622 B2
(45) Date of Patent: Aug. 17, 2021

(54) ELECTRONIC SYSTEM AND METHOD FOR MANAGING DIGITAL CONTENT RELATING TO WORKS OF ART

(71) Applicant: Cinello S.r.l., Piacenza (IT)

(72) Inventors: John Sergio Blem, Skovlunde (DK); Franco Losi, Piacenza (IT)

(73) Assignee: Cinello S.r.l., Piacenza (IT)

( * ) Notice: Subject to any disclaimer, the term of this patent is extended or adjusted under 35 U.S.C. 154(b) by 81 days.

(21) Appl. No.: 15/762,598

(22) PCT Filed: Sep. 22, 2016

(86) PCT No.: PCT/IB2016/055663
§ 371 (c)(1),
(2) Date: Mar. 23, 2018

(87) PCT Pub. No.: WO2017/051344
PCT Pub. Date: Mar. 30, 2017

(65) Prior Publication Data
US 2018/0285574 A1    Oct. 4, 2018

(30) Foreign Application Priority Data

Sep. 24, 2015  (IT) .......................... UB2015A003847

(51) Int. Cl.
*G06F 21/60* (2013.01)
*G06F 21/10* (2013.01)
(Continued)

(52) U.S. Cl.
CPC ............ *G06F 21/602* (2013.01); *G06F 21/10* (2013.01); *H04L 9/0866* (2013.01);
(Continued)

(58) Field of Classification Search
CPC ...... H04L 2209/605; H04L 9/08–0897; G06Q 30/0611; G06Q 2220/00–18; G06F 21/60–6281; G06F 21/10–105
See application file for complete search history.

(56) References Cited

U.S. PATENT DOCUMENTS 8,826,036 B1 *  9/2014  Snodgrass ............... G06F 21/10
                                                          370/235
10,425,391 B2 *  9/2019  Mityagin .............. H04L 63/123
(Continued)

FOREIGN PATENT DOCUMENTS

EP        0679980 A1    11/1995

OTHER PUBLICATIONS

Eskicioglu, Ahmet M., and Edward J. Delp. "An overview of multimedia content protection in consumer electronics devices." Signal Processing: Image Communication 16.7 (2001): 681-699. (Year: 2001).*

(Continued)

*Primary Examiner* — Madhuri R Herzog
(74) *Attorney, Agent, or Firm* — Leber IP Law; Sarah M. Gates

(57) ABSTRACT

The present invention concerns an electronic system and a method for managing digital content relating to works of art adapted for preventing the uncontrolled diffusion thereof. The electronic system (10) for managing digital content relating to works of art is characterised in that it comprises at least one importing unit (11) of files comprising digital content relating to works of art associated with at least one display unit (12) of digital content relating to works of art, wherein the importing unit (11) comprises encrypting/decrypting means (11a) of the files comprising digital content relating to works of art, the encrypting/decrypting means comprising means for generating a unique encryption key based on at least one identification code associated in a (Continued)

unique manner with the display unit (12,12') and/or with at least one electronic part (12*a*,14*a*;12*a'*,14*a'*) comprised in the same (12,12'). The method (100) for managing digital content relating to works of art is characterised in that it comprises the steps consisting of importing (110) at least one file comprising digital content relating to works of art; acquiring (150) at least one identification code associated in a unique manner with a display unit (12,12') and/or with at least one electronic part (12*a*,14*a*;12*a'*,14*a'*) comprised in the same (12,12'); generating (160) a unique encryption key based on the at least one identification code acquired; encrypting (170) the at least one imported file with the unique key generated; and storing (180) the encrypted file.

13 Claims, 4 Drawing Sheets

(51) Int. Cl.
*H04L 9/08* (2006.01)
*G06Q 30/06* (2012.01)

(52) U.S. Cl.
CPC .......... *H04L 9/0872* (2013.01); *H04L 9/0877* (2013.01); *G06Q 30/0611* (2013.01); *G06Q 2220/00* (2013.01); *H04L 2209/605* (2013.01); *H04L 2209/80* (2013.01)

(56) References Cited

U.S. PATENT DOCUMENTS

| | | | | |
|---|---|---|---|---|
| 2003/0123667 | A1* | 7/2003 | Weber | H04L 9/0866 380/277 |
| 2004/0034600 | A1* | 2/2004 | Senoh | H04L 9/0866 705/50 |
| 2004/0158707 | A1* | 8/2004 | Kim | H04L 63/0435 713/153 |
| 2005/0149755 | A1* | 7/2005 | Shima | H04L 9/0844 726/4 |
| 2007/0118766 | A1 | 5/2007 | Li Fo Sjoe | |
| 2008/0016307 | A1* | 1/2008 | Takano | G06F 11/1469 711/164 |
| 2008/0228821 | A1* | 9/2008 | Mick | H04N 21/2541 |
| 2009/0282241 | A1 | 11/2009 | Prafullchandra et al. | |
| 2010/0002146 | A1* | 1/2010 | Tsukagoshi | G09G 5/12 348/581 |
| 2010/0250438 | A1 | 9/2010 | Hamnen et al. | |
| 2011/0314299 | A1 | 12/2011 | Lee | |
| 2013/0266137 | A1 | 10/2013 | Blankenbeckler et al. | |
| 2014/0052981 | A1* | 2/2014 | King | H04W 12/04031 713/155 |
| 2014/0232941 | A1* | 8/2014 | Tsukagoshi | H04N 5/4401 348/725 |
| 2014/0281559 | A1 | 9/2014 | Trachtenberg et al. | |
| 2015/0287432 | A1* | 10/2015 | Nakano | G06F 21/10 386/259 |

OTHER PUBLICATIONS

Bertolissi, Edy, International Search Report and Written Opinion, dated Jan. 18, 2017, European Patent Office.

"IMac (Late 2009) and iMac (Mid 2010): External features, ports, and connectors—Apple Support", Jan. 10, 2017 (Jan. 10, 2017), URL:https://support.apple.com/en-us/HT2019.

* cited by examiner

ELECTRONIC SYSTEM AND METHOD FOR MANAGING DIGITAL CONTENT RELATING TO WORKS OF ART

The present invention concerns an electronic system and a method for managing digital content relating to works of art adapted for preventing the uncontrolled diffusion thereof.

With the advent of digital technology, the copying and diffusion of digital content, for example in the form of electronic files, is extremely easy and simplified.

Moreover, the widespread use of electronic devices adapted for displaying images, like for example personal computers or smart devices, as well as the wide availability of broadband connections to the global telecommunications network, like the Internet, have made access to digital content available to every single user, substantially anywhere they may be.

In the present description and in the claims the expression "smart device" refers to electronic devices (portable or not), capable of interfacing with telecommunications networks (wired or wireless) and comprising means for displaying digital images, like for example smartphones, tablets, smart TVs and so on.

In line with such developments, the Applicant has noticed that there is a need for art lovers or collectors to be able to consult or in any case have access to their works of art at any moment or location, a possibility potentially offered by digital works of art. In other words, the Applicant has identified an increasing demand for digital works of art due mainly to the potential linked to the digital form and to the possibilities of use that such a form offers.

In the present description and in the claims the expression "digital work of art" is meant to indicate a digital content having a work of art as its object.

The Applicant has however considered that the art market needs, as a primary requisite, for all works to be and remain unique or in any case in a limited and controllable number of copies, so that it does not lose value. This is in stark contrast with the circumstances that characterise the exchange and diffusion of digital content, making it particularly difficult to manage digital works of art.

Indeed, the purchase of a work of art is classically and historically considered an investment, different from normal purchases in that its value is maintained or increases over time, possibly being able to be resold at a later time substantially without losses.

The Applicant has identified that, in order to this to be ensured also in the field of the buying and selling of digital works of art, it is essential to be able to prevent the copying and diffusion of the specific digital content having the work of art as its object.

However, currently no specific technology exists for digital content relating to works of art that is capable of ensuring high security against the duplication and diffusion of such digital content.

Indeed, it is known to encrypt files with access keys of varying degrees of complexity. However, with a suitable calculation power and sufficient time available it is generally possible to work out the encryption key, making the digital content of an encrypted file accessible and therefore duplicable unencrypted.

The Applicant has also considered that in the field of art trading, in which large sums of money are involved, it is reasonable to think that powerful decryption tools will be used, which are therefore capable of accessing the digital content of an encrypted file. Therefore, the simple encrypting of files of digital content relating to works of art is not a sufficient measure to ensure an adequate level of security for the requirements of the art market.

In light of the above, the problem forming the basis of the present invention is therefore that of devising an electronic system for managing digital content having works of art as its object capable of ensuring a sufficient level of security to prevent the unauthorised duplication and diffusion of digital works of art, i.e. digital content relating to works of art.

For this purpose, the Applicant has identified the need to make an electronic system for managing digital content having works of art as its object provided with specific encryption means capable of preventing access to such digital content and therefore the diffusion thereof.

In accordance with a first aspect thereof, the invention therefore concerns an electronic system for managing digital content relating to works of art that is characterised in that it comprises at least one importing unit of files comprising digital content relating to works of art associated with at least one display unit of digital content relating to works of art, wherein the importing unit comprises encrypting/decrypting means of the files of digital content relating to works of art, the encrypting/decrypting means comprising means for generating a unique encryption key based on at least one identification code associated in a unique manner with the display unit and/or with an electronic part comprised in the same.

The Applicant has observed that the particular means for generating an encryption key used in the electronic system according to the present invention, as well as generating a unique key for every file of digital content relating to a work of art, ensure that the opening of such a file can take place only if the identification code of the display unit with which the file is "opened" corresponds to the identification code based on which the means for generating the key generated the key in the encryption step. In other words, the opening of the file can only be successful if the display unit with which the content of the file is accessed corresponds to the display unit of the electronic system or associated with it.

Indeed, the identification code of each electronic part making up the display unit (like for example the memory means, a processor and so on) consists of an alphanumeric string set by the producer in the sub-system of each part at the moment of production. Such a code cannot be modified or replaced, as well as being specific and unique for each electronic part. Therefore the electronic parts present on display units other than that of the electronic system according to the present invention will be characterised by identification codes different from those of the electronic parts of the display unit of the system, therefore making it impossible to open the file outside of the system.

The same degree of uniqueness and security is ensured by a code associated in a unique manner with the display unit itself, like for example the coordinates relative to the position of the display unit (in the case in which it is fixed), for example provided by a possible GPS module comprised in such a unit or by another wireless positioning system. Such a code—used as an alternative or, preferably, in addition to the identification code of an electronic part making up the display unit—further increases the degree of security offered by the electronic system according to the invention, ensuring access to the digital content exclusively at the (fixed) position where the display unit is located.

In this way, it is sufficiently ensured that a fraudulent attempt to open the file carried out on devices different from those of the electronic system according to the present invention cannot be successful.

In accordance with a second aspect thereof, the invention concerns a method for managing digital content relating to works of art characterised in that it comprises the steps consisting of:

- importing at least one file comprising digital content relating to works of art;
- acquiring at least one identification code associated in a unique manner with a display unit and/or with at least one electronic part comprised in the same;
- generating a unique encryption key based on the at least one identification code acquired;
- encrypting the at least one imported file with the unique key generated
- storing the encrypted file.

Advantageously, the method for managing digital content relating to works of art according to the invention achieves the technical effects described above in relation to the electronic system for managing digital content relating to works of art.

The present invention can have at least one of the following preferred features, which can in particular be combined with each other as desired in order to satisfy specific application requirements.

Preferably, the display unit is directly connected to the importing unit, said display unit being connected to at least one electronic device arranged remotely equipped with a display screen through at least one telecommunications network.

According to a first advantageous variant of the electronic system according to the invention, it is foreseen for a user that has acquired the digital content relating to a work of art to be able to display the work of art on his/her own electronic devices without there being a physical transfer of the relative file. In other words, the digital content is available uniquely through the electronic system according to the invention. The file is decrypted and opened in the system itself and only the digital content of such a file is transferred to the electronic device of the user through a secure channel opened in a telecommunications network. The user will therefore be able to display the work without having the file.

In this way, it is further ensured that it is not possible to generate accessible copies of the files and the diffusion of the digital work of art is thus effectively prevented.

Alternatively, the display unit is arranged remotely, being connected to the importing unit through a telecommunications network, said display unit being connected to at least one electronic device equipped with a display screen.

According to a further advantageous variant of the electronic system according to the invention, it is foreseen for the file to be physically transferred to the user that has acquired the digital content relating to a work of art. In this case, the importing unit is placed in communication with a display unit that is located at the user. The importing unit acquires a unique identification code of at least one electronic part of such a display unit from the display unit and—before transferring the file—encrypts it based on such a unique identification code, therefore linking it directly to the specific display unit of the user. In this way, advantageously, the user can display the digital content even in the absence of a connection to the telecommunications network. However, the unique link between the display unit and the file determines a high level of security and prevention of the duplication and diffusion of such a file.

Preferably, the electronic part of the display unit are memory means adapted for conserving the files comprising digital content relating to works of art.

Alternatively, the electronic part of the display unit is at least one electronic processing means, like for example a processor.

Preferably, the identification code associated in a unique manner with the display unit are the coordinates relative to the position of such a display unit.

More preferably, the coordinates relative to the position of the display unit are obtained by a wireless positioning module, even more preferably by a GPS module.

Such a provision makes it possible, in particular in the case of fixed display units, to increase the degree of security of the system, linking the encryption key to the exact position of such a display unit.

Preferably, the means for generating a unique encryption key operate in addition based on a piece of time data.

Such a preferred feature advantageously makes it possible to manage a possible displaying of digital content relating to a work of art according to the terms of a subscription, for example comprising a time limit. In particular, an encryption key is used with time validity contained in the piece of time data used for generating it.

Preferably, the system comprises back-up memory means containing back-up files comprising digital content relating to works of art, said back-up files being encrypted through a unique encryption key generated based on at least one identification code of the back-up memory means.

Advantageously, this makes it possible to access the content of the files even in the case of malfunction of the display unit, whilst still maintaining the degree of security of the system against the copying and diffusion of the files. Otherwise, even recovering the files and transferring them into another operating display unit, it would no longer be possible to open them since they would be housed in a display unit having electronic parts provided with different identification codes with respect to that used for encrypting the file.

Preferably, the importing unit is adapted for assigning a unique serial number to each file comprising digital content relating to works of art received in input, said means for generating the encryption key operating in addition based on said unique serial number.

More preferably, the means for generating the encryption key are adapted for adding a secret prefix to the unique serial number associated with the file in the acquisition step.

In this way, the security level is advantageously increased since a unique code generated by the system itself and suitably modified is used, which is therefore not easy to obtain.

Preferably, the importing unit and the display unit are connected to a telecommunications network respectively for receiving files comprising digital content relating to works of art and transmitting digital content relating to works of art.

More preferably, the display unit is adapted for generating a secure transmission channel, preferably of the SSL type, for managing a flow of encrypted digital content relating to works of art.

Preferably, the system comprises in addition a unit for managing the printing of the digital content relating to works of art connected to at least one printer for two- and/or three-dimensional printing of the digital content relating to works of art.

In this way, every user has the possibility of requesting for the work of art to be printed and physically transmitted based on the number of copies acquired for printing. In the case of printing one copy, it will be necessary to acquire a second copy in order for electronic displaying to also be allowed.

Preferably, the electronic system also comprises a user interface unit and a unit for managing sales operations of the digital content relating to works of art.

More preferably, the unit for managing sales operations allows the users to offer digital content relating to a work of art for sale to a plurality of users or to a single user.

Even more preferably, the unit for managing sales operations allows digital content relating to a work of art to be auctioned or sold at a fixed price.

When the work of art is sold, the property is transferred and the previous owner at that point can no longer view the work of art that has been sold, unless the number of copies sold is less than what was originally acquired.

Preferably, the system comprises additional memory means containing data relating to the owners of the digital content relating to works of art acquired.

Advantageously, if such data is updated upon each change of ownership, the additional memory means can constitute a historical record of the single transfers of property.

More preferably, the user interface unit and the unit for managing sales operations interface with the additional memory means in order to keep the ownership data of the digital content relating to works of art object of a sale up to date.

Preferably, the step of generating a unique encryption key takes place based on at least one identification code of memory means of the display unit.

Alternatively, the step of generating a unique encryption key takes place based on at least one identification code of an electronic processing means of the display unit.

Preferably, the management method comprises in addition the steps consisting of:
  generating a unique encryption key based on at least one identification code of back-up memory means;
  encrypting the at least one imported file with the unique key generated from the identification code of said back-up memory means;
  storing the encrypted file in the back-up memory means.

Preferably, the step of importing at least one file comprising digital content relating to works of art comprises the step of assigning a unique serial number to the imported file and the step of generating the unique encrypted key comprises the step of obtaining such a key also from the unique serial number assigned.

More preferably, the step of generating the unique encrypted key comprises the prior step of adding a prefix to the unique serial number associated in the importing step.

Further features and advantages of the present invention will become clearer from the following detailed description of some preferred embodiments thereof, made with reference to the attached drawings.

The different features in the single configurations can be combined together as desired according to the previous description, if it is necessary to take advantage of the advantages resulting specifically from a particular combination.

In such drawings.

In the following description, in order to illustrate the figures identical reference numerals or symbols are used to indicate structural elements with the same function. Moreover, for the sake of clarity of illustration, some references may not be repeated in all of the figures.

Figure 1:
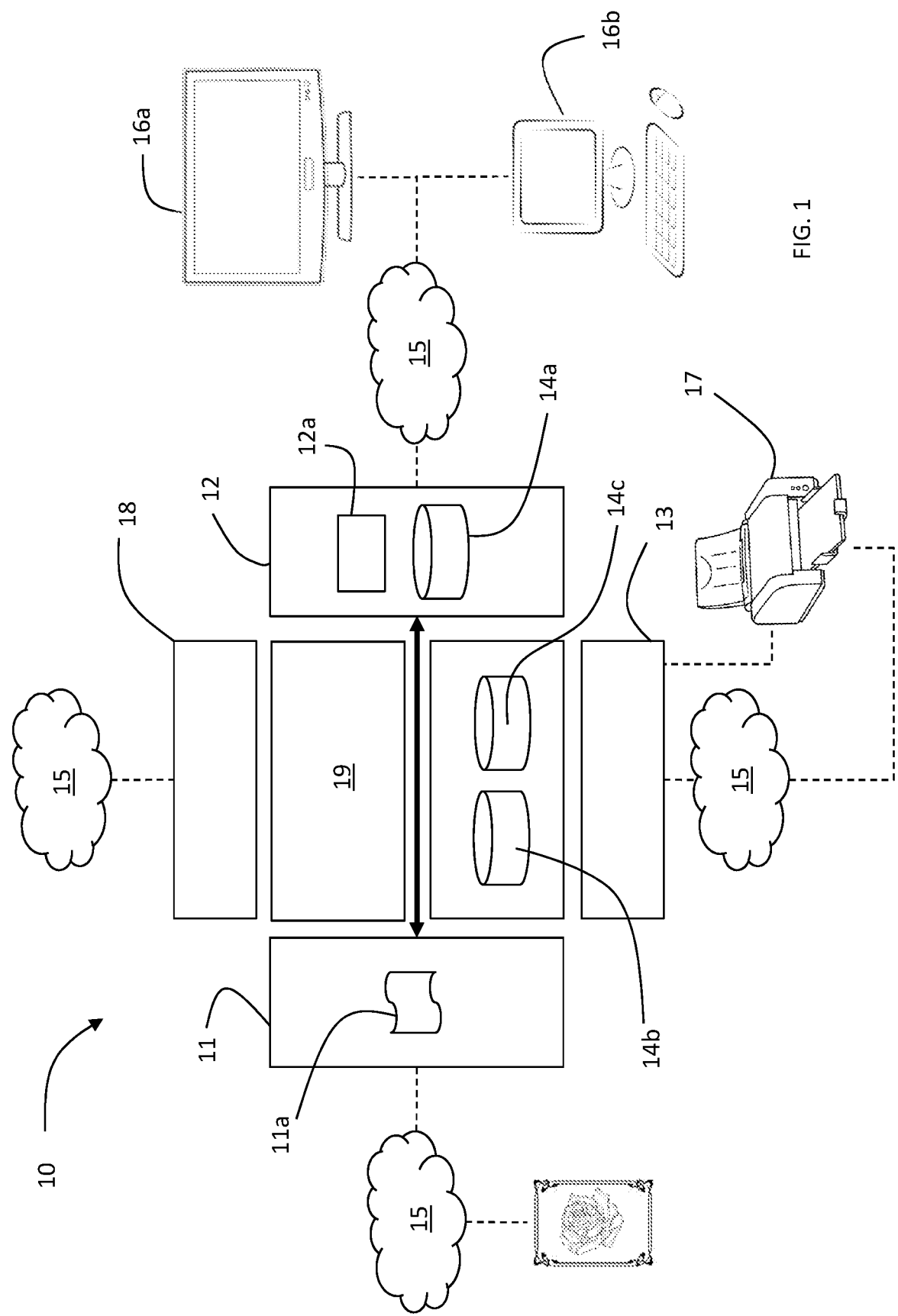
FIG. 1 is a block diagram of a first preferred embodiment of the electronic system for managing digital content relating to works of art according to the present invention.

With reference to FIG. 1, a first embodiment of an electronic system for managing digital content relating to works of art is shown, wholly indicated with 10.

Such a system 10 comprises a plurality of units 11,12,13, 18,19 including at least one unit 11 for importing digital content relating to works of art, as well as a unit 12 for displaying digital content relating to works of art.

In particular, according to the illustrated embodiment, the display unit 12 comprises first memory means 14a adapted for conserving the digital content relating to works of art. The first memory means 14a contain a plurality of encrypted files each relating to the digital content of a work of art and data concerning the relative works of art. For example, the first memory means 14a contain the serial number of every work, the name of the authors of the works, the dates of creation of the works, the number of copies for sale, the current availability, descriptions of what the works of art represent and/or of the styles with which they were made, the printing methods, and so on.

The system 10 also comprises second memory means 14b containing a back-up copy of the digital content relating to works of art.

The system 10 comprises in addition third memory means 14c containing data relating to the owners of the digital content relating to works of art acquired. Such data is updated every time there is a change of ownership, therefore constituting a historical record of the single changes of ownership.

Among the units that make up the system 10, it is also foreseen for there to be a unit 13 for managing the printing of the digital content relating to works of art connected to at least one printer 17 for two- and/or three-dimensional printing of the digital content relating to works of art.

The importing 11, display 12 and printing 13 units are connected to interface means (not shown) with a global telecommunications network 15, for example Internet, through which the digital content is transmitted and received.

The importing unit 11 is adapted for managing the receiving of files of digital content relating to works of art through connection to the global telecommunications network 15.

The importing unit 11 comprises encrypting/decrypting means 11a of the files received in input.

The encrypting/decrypting means 11a comprise means for generating a unique encryption key based on a unique serial number associated with the file in the acquisition step by the importing unit 11, preferably after modification, as well as on an identification code of at least one electronic part of the display unit 12 through which the encrypted file will be displayed. For example, the electronic part of the display unit 12 are the first memory means 14a or alternatively electronic processing means 12a of such a display unit 12.

The means for generating the key are adapted for adding a prefix (possibly generated by a random algorithm) known only to the same means for generating the key to the unique serial number associated with the file in the acquisition step.

Preferably, the means for generating the key are provided with obscuring means adapted for preventing access to the operating algorithm thereof.

In the embodiment illustrated in FIG. 1, the display unit 12 is adapted for managing a flow of encrypted digital content relating to works of art upon request received through connection to the telecommunications network 15.

For this purpose, at least one electronic device 16a,16b of a user like for example a smart TV 16a, a personal computer 16b and so on, comprises a software application adapted for interfacing remotely with the display unit 12 to generate a secure transmission channel, for example of the SSL type, through which to receive digital content relating to a work of art.

The software application manages access to the system 10 by the user through credentials. In this way, the user acquires access to the digital content associated with him/her. Specifically, the user acquires access to the digital content that has previously been the object of a sale which has brought ownership thereof to the user.

In this way, the user can select among the digital content associated with him/her, which content to display through his/her electronic device 16a,16b and/or other electronic devices associated with the user possibly all connected to the same local telecommunications network.

The software application installed on the electronic device 16a,16b of the user only allows the digital content associated with the specific user to be displayed remotely, said content in any case remaining in the memory means 14a of the display unit 12. Therefore, in the embodiment illustrated in FIG. 1, the electronic device 16a,16b of the user is not sent an encrypted copy of the digital content, in such a way preventing local storage thereof.

Figure 2:
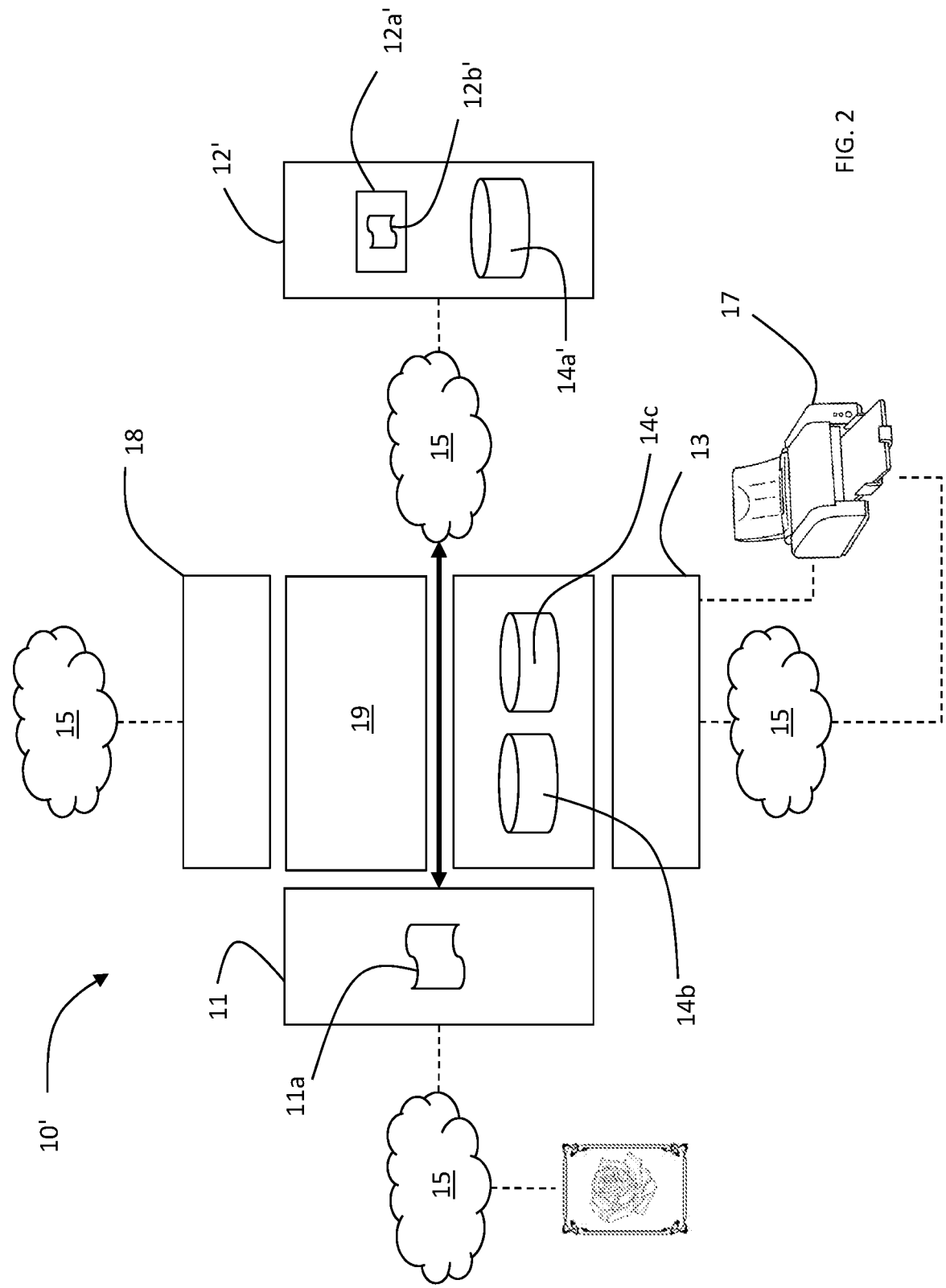
FIG. 2 is a block diagram of a second preferred embodiment of the electronic system for managing digital content relating to works of art according to the present invention.

With reference to FIG. 2, a second embodiment of the electronic system for managing digital content relating to works of art is shown, wholly indicated with 10'.

The second embodiment of the electronic system 10' differs from the first substantially by the display unit 12', which is arranged remotely with respect to the importing unit 11 and communicates with it through the telecommunications network 15.

Such system architecture therefore foresees that the display unit 12' is arranged at the user. For example, the display unit 12' can be a smart TV, a personal computer and so on, comprising software means 12b' adapted for interrogating at least one electronic part 12a',14a' of the display unit 12' (for example the relative first memory means 14a' or electronic processing means 12a') and for interfacing with the importing unit 11 in order to transmit the at least one identification code detected.

Therefore, the encrypting/decrypting means 11a of the importing unit 11 carry out the encrypting of the file based on the identification code of the electronic part 12a',14a' of the remote display unit 12'.

Once encrypted, the file is transferred into the first memory means 14a' of the remote display unit 12' and, to open it, the software means 12b' comprise encrypting/decrypting means analogous to those 11a present in the importing unit 11. The file can therefore be decrypted locally, but remains restricted to the specific remote display unit 12'. In other words, the content of the file is not accessible except through the remote display unit 12'.

In both of the embodiments illustrated in FIGS. 1 and 2, the unit for managing printing 13 is adapted for managing a printing queue and distributing the printing jobs to at least one printer 17.

The at least one printer 17 can alternatively or in addition be arranged at the unit for managing printing 13 or remotely (for example at a printing works). In such a second case the connection between the unit for managing printing 13 and the at least one printer 17 is made through the global telecommunications network 15.

The electronic system 10,10' for managing digital content relating to works of art also comprises a user interface unit 18 also connected to interfacing means (not shown) with the global telecommunications network 15, and a unit 19 for managing sales operations of the digital content relating to works of art.

The unit 19 for managing sales operations allows different modes of interaction between the users including offering digital content relating to a work of art for sale on the market (i.e. the whole of the remaining users) by an artist user, a user who is the owner of digital content previously acquired or an art dealer user. The unit 19 for managing sales operations is adapted for making the offers for sale on the market in the form of an auction or at a fixed price. Moreover, the unit 19 for managing sales operations is adapted for making a private offer for sale between two users.

The user interface unit 18 and the unit 19 for managing sales operations interface with the third memory means 14c in order to keep the ownership data of the digital content relating to works of art object of sale up to date.

Preferably, it is possible to provide temporary access for displaying digital content relating to works of art for sale.

Figure 3:
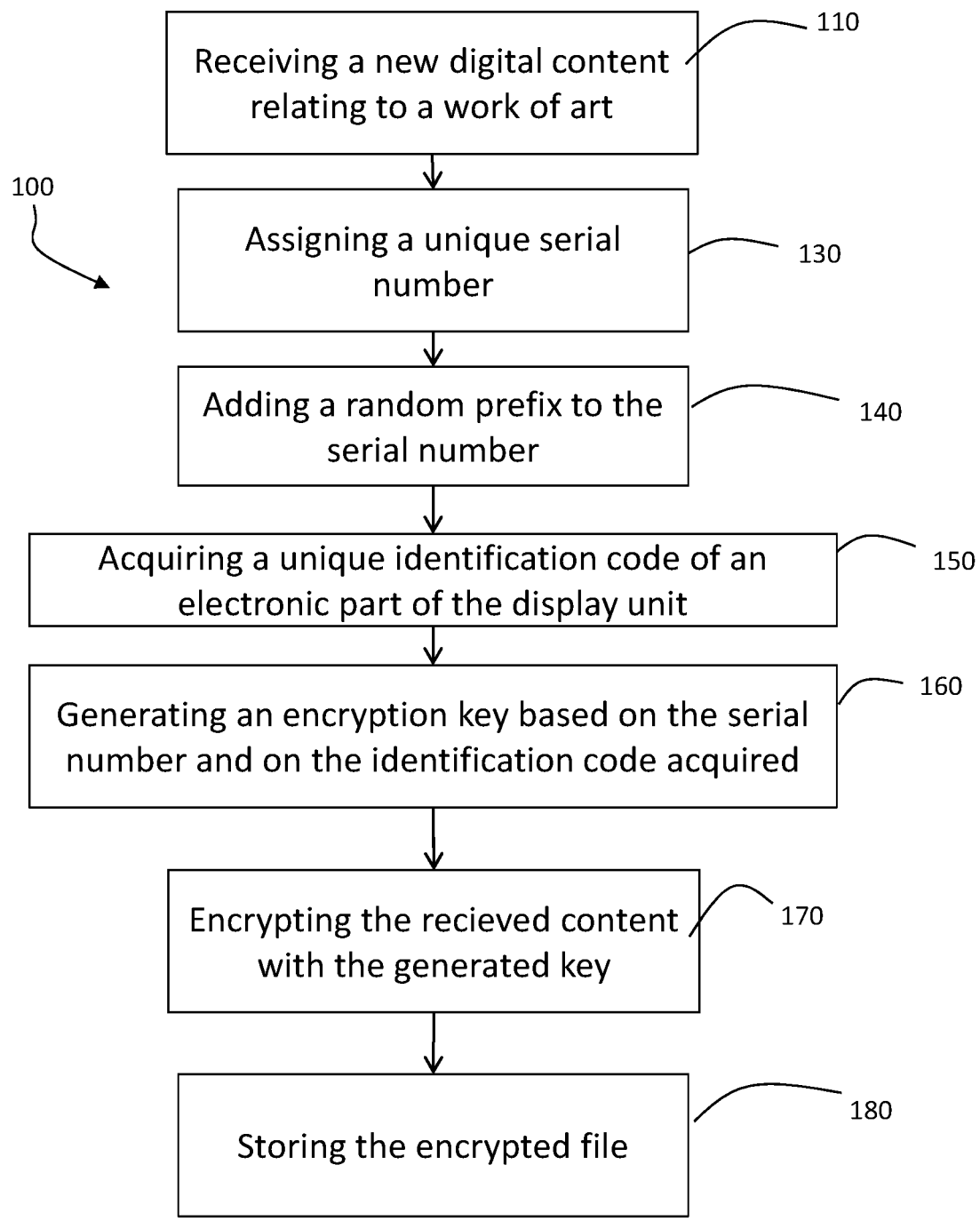
FIG. 3 is a schematic diagram illustrating the step of loading digital content relating to a work of art into the electronic system according to the present invention.
Figure 4:
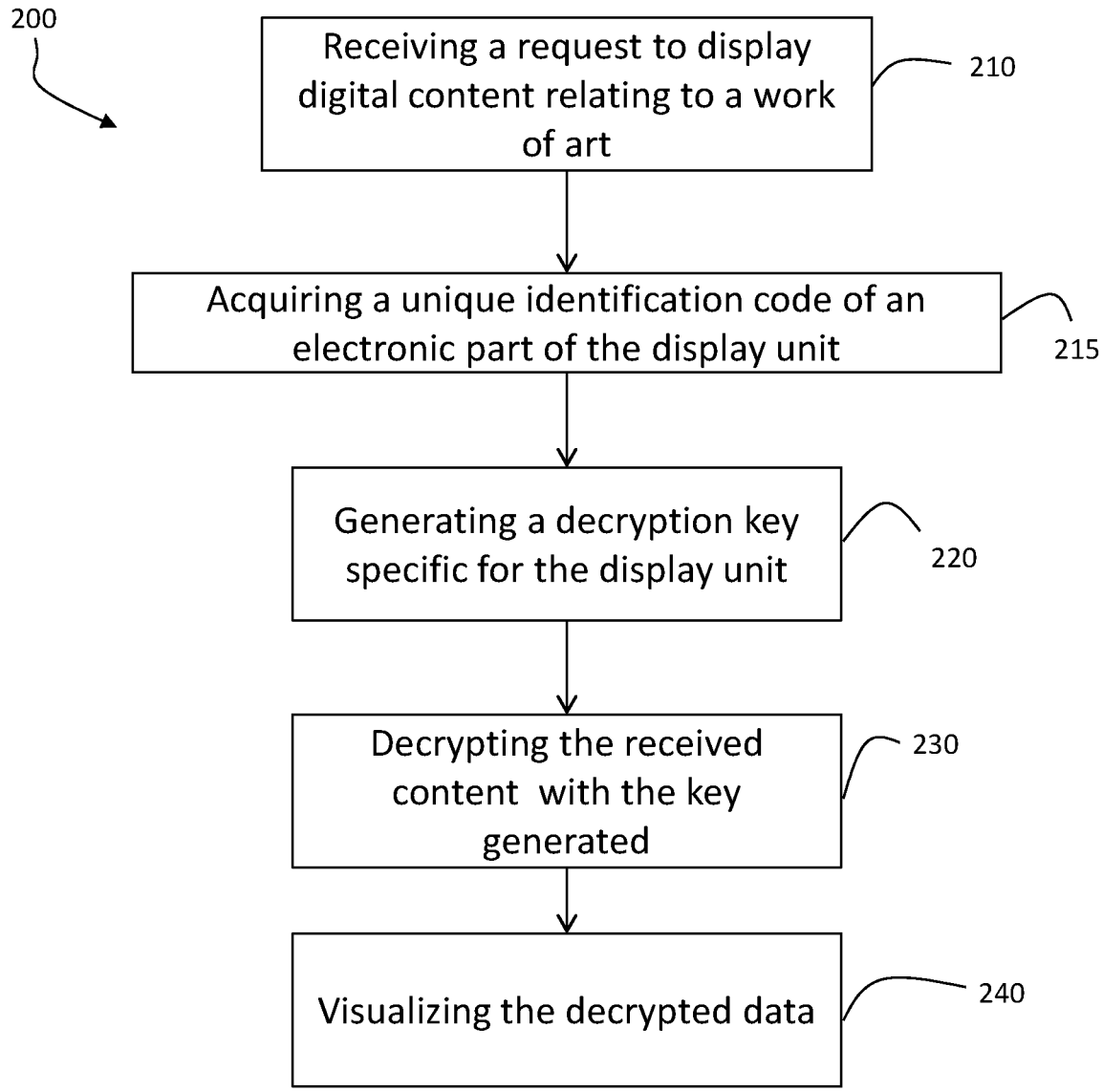
FIG. 4 is a schematic diagram illustrating the step of displaying digital content relating to a work of art managed by the electronic system according to the present invention.

The method 100,200 for managing digital content relating to works of art implemented by the system 10 according to the present invention is schematically illustrated in FIGS. 3 and 4.

Once a file of digital content relating to works of art is received in input 100, through connection to the global telecommunications network, it is assigned a unique serial number (step 130).

After the serial number has been assigned, a step 160 of generating an encryption key takes place. Such an encryption key is generated from the unique serial number previously associated with the file (during step 130) and with the identification code of an electronic part 12a,14a,12a',14a' of the display unit 12,12' that is previously acquired (step 150) and transferred to the encrypting/decrypting means 11a of the importing unit.

The file is therefore encrypted 170 with the encryption key generated and the encrypted file is stored 180, for example on the memory means 14a,14a' of the display unit 12,12'.

Correspondingly, given that the back-up memory means 14b in which the back-up copy files are stored are characterised by a different identification code with respect to the code of the memory means 14a,14a' of the display unit 12,12', the acquisition step 150 of an identification code of an electronic part, the step of generating 160 an encryption key, the encryption step 170 of the file and the subsequent storage 180 of the encrypted file in the corresponding back-up memory means 14b are also carried out for such a copy. In this case the encryption key is generated based on the identification code of the back-up memory means 14b.

In other words, the means for generating a unique encryption key generate a second encryption key, different from the first, based on which the encryption of the back-up copy file takes place.

Such a copy file can therefore be opened only if arranged in the back-up memory means 14b.

If, for operative reasons, the files must be moved from memory means to other memory means, it will be necessary to decrypt the file still arranged in the starting memory means to then move the file unencrypted and repeat the encryption operation once the file is located in the other memory means, generating a new encryption key from the identification code of the destination memory means.

Preferably, the step of generating the encryption key foresees a prior step that consists of adding 140 a prefix (possibly generated by a random algorithm) to the unique serial number associated with the file being acquired. The prefix is preferably known only to the means for generating the key themselves.

Correspondingly, once a request to display digital content relating to a work of art has been received (step 210) from a user associated with such digital content (owner), the identification code of an electronic part 12a,14a,12a',14a' of the display unit 12,12' is acquired (step 215) and transferred to the encrypting/decrypting means 11a of the importing unit 11 or to the encrypting/decrypting means comprised in the software means 12b of the remote display unit.

Based on the acquired code a specific decryption key for the file containing the requested digital content is generated (step 220). The decryption key is generated based on the unique serial number associated with such digital content (possibly modified with a prefix) and the identification code previously acquired relating to at least one electronic part 14a,14a',12a,12a' of the display unit 12,12' through which the encrypted file will be displayed. For example, the identification code is that of the memory means 14a,14a' of such a display unit 12,12'. In the case of the back-up file, the identification code is that of the back-up memory means 14b.

Based on the decryption key thus obtained, the access (step 230) to the digital content of the file takes place.

Depending on the different embodiments, the user is therefore capable of displaying the digital content that he/she owns.

In a first case, the decryption takes place on the local display unit 12 and the content of the unencrypted file is transmitted (step 240) through the global telecommunications network 15 to at least one electronic device 16a,16b without the file being physically transferred (unencrypted or encrypted) to it. Such an electronic device 16a,16b is only responsible for displaying the digital content.

In a second case, the remote display unit 12', on which the file is housed, is equipped with the software means 12b' that, as already outlined above, are adapted for interrogating at least one electronic part 12a',14a' of the display unit 12' itself in order to acquire the identification code thereof, as well as for carrying out the decryption of the file originally encrypted through the encrypting/decrypting means 11a resident on the importing unit 11. The displaying of the digital content takes place through the remote display unit 12' itself.

In both cases, the encrypted file is linked in a unique manner to the display unit 12,12' so that any attempt at copying is prevented and the diffusion of the file is strongly blocked. Indeed, it should be considered that if the file were taken onto a different display unit, it could not be opened, since the identification codes of the electronic parts of such a display unit would be different, not allowing a decryption key adapted for opening the file to be reconstructed. In this way, the file is prevented from being able to be effectively duplicated and diffused.

From the description that has been made, the features of the system and of the method for managing digital content relating to works of art object of the present invention are clear, just as the relative advantages are also clear.

Further variants from the embodiments described above are possible, without departing from the teaching of the invention.

Finally, it is clear that a system and a method for managing digital content relating to works of art thus conceived can undergo numerous modifications and variants, all of which are covered by the invention; moreover, all of the details can be replaced by technically equivalent elements. In practice, the materials used, as well as the sizes, can be whatever according to the technical requirements.

The invention claimed is:

1. An electronic system for managing digital content relating to works of art comprising:
    at least one importing unit for importing files comprising digital content relating to works of art configured to receive said files comprising digital content relating to works of art via connection to a telecommunications network and to assign a unique serial number to each received file comprising digital content relating to works of art, the at least one importing unit comprising encrypting/decrypting means for encrypting/decrypting said files of digital content relating to works of art, and
    at least one display unit of digital content relating to works of art comprising electronic processing means provided with encrypting/decrypting software means and first memory means for storing encrypted files of digital content relating to works of art, the at least one display unit being operatively connected to the at least one importing unit;
    wherein the encrypting/decrypting means of the importing unit is configured to generate a unique encryption key for each file comprising digital content relating to works of art based on a combination of the unique serial number assigned to said file, at least one identification code associated in a unique manner with said display unit, and at least one identification code associated in a unique manner with said electronic processing means and/or said first memory means of the display unit, and to encrypt each file comprising digital content relating to works of art using the corresponding unique encryption key to produce a corresponding encrypted file; and
    wherein the encrypting/decrypting software means of said display unit is configured to receive said encrypted file from the importing unit, and to decrypt said encrypted file.

2. The electronic system according to claim 1, wherein said display unit is directly connected to said importing unit or is remotely connected to said importing unit through interposition of the telecommunications network.

3. The electronic system according to claim 1, wherein said at least one identification code associated in a unique manner with said display unit are coordinates measured relative to a position of said display unit.

4. The electronic system according to claim 1, wherein said encrypting/decrypting means of said importing unit is further configured to generate said a unique encryption key further based on a piece of time data.

5. The electronic system according to claim 1, further comprising back-up memory means containing back-up files comprising digital content relating to works of art, said back-up files being encrypted through a unique encryption key generated based on at least one identification code of said back-up memory means.

6. The electronic system according to claim 1, wherein said encrypting/decrypting means of said importing unit is further configured to add a secret prefix to the unique serial number assigned to the file by the importing unit.

7. A method for managing digital content relating to works of art comprising the steps of:
   importing, with an importing unit, at least one file comprising digital content relating to works of art via a telecommunications network;
   assigning, with the importing unit, a unique serial number to the at least one imported file;
   acquiring at least a first identification code associated in a unique manner with a display unit and at least a second identification code associated in a unique manner with electronic processing means and/or first memory means of the display unit;
   generating a unique encryption key based on a combination of the unique serial number, the at least first identification code and the at least second identification code;
   encrypting, with the importing unit, the at least one imported file with said unique encryption key to obtain an encrypted file;
   transferring the encrypted file from said importing unit to said display unit; and
   storing the encrypted file.

8. The method according to claim 7, wherein said identification code associated in a unique manner with said display unit are coordinates relative to a position of said display unit.

9. The method according to claim 7, wherein said step of generating a unique encryption key is further based on a piece of time data.

10. The method according to claim 7 further comprising the steps of:
    generating a unique encryption key based on at least one identification code of back-up memory means;
    encrypting the at least one imported file with the unique key generated from the identification code of said back-up memory means to obtain an encrypted file; and
    storing the encrypted file in said back-up memory means.

11. The method according to claim 7, wherein prior to the step of generating the unique encrypted key, the method comprises the step of adding a prefix to the unique serial number.

12. The electronic system according to claim 4, wherein the piece of time data is a piece of time limit data.

13. The electronic system according to claim 1, wherein the encrypting/decrypting software means of said display unit is configured to generate a unique decryption key based on said combination of the unique serial number assigned to said encrypted file, said at least one identification code associated in a unique manner with said display unit, and said at least one identification code associated in a unique manner with said electronic processing means and/or said first memory means of the display unit, and to decrypt said encrypted file using said unique decryption key.

* * * * *